UNITED STATES PATENT OFFICE.

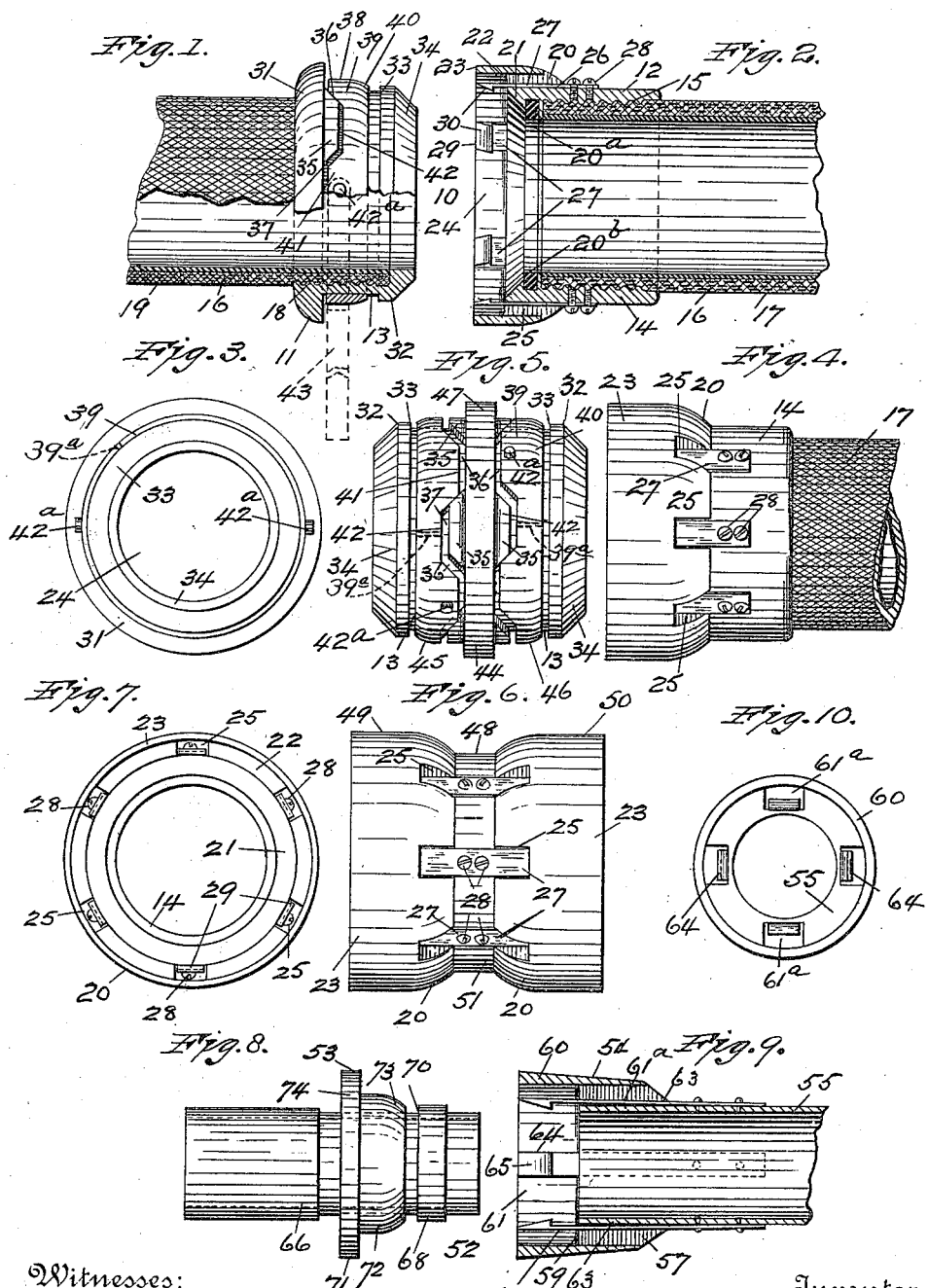

GEORGE J. COURTNEY, OF RICHMOND HILL, NEW YORK, ASSIGNOR TO SANGER NOZZLE CO., INC., A CORPORATION OF NEW YORK.

COUPLING.

1,063,418.  Specification of Letters Patent.  Patented June 3, 1913.

Application filed February 11, 1911. Serial No. 607,923.

*To all whom it may concern:*

Be it known that I, GEORGE J. COURTNEY, a citizen of the United States, and a resident of Richmond Hill, county of Queens, and State of New York, have invented certain new and useful Improvements in Couplings, of which the following is a full, clear, and exact specification.

This invention relates to a class of couplings or devices adapted to detachably connect the opposed ends of hose, or pipe of various kinds, and which may be used for connecting parts of other articles.

My invention has for its object primarily to provide a compact and efficient coupling or device for connecting hose, or pipe of different forms as well as other articles, and wherein a male and a female member of novel design are employed to permit said members to be conveniently and readily coupled and held against displacement, or quickly detached from each other when desired; to provide a threadless form of coupling wherein the two parts may be quickly connected or disconnected in the dark as occasion requires thereby dispensing with the necessity of precisely positioning the parts as incidental to the usual form of threaded couplings; and to provide a coupling of special advantageous form which when applied more particularly to fire hose will permit the members thereof to be coupled or separated without any relative rotation, thus preventing all kinks or twists in the hose which are frequently obstacles to the passage of water therethrough or tend to lessen the pressure of water in its passage through the hose.

Another object of the invention is to provide the female member with a plurality of yielding gripping elements, or spring catches, arranged in spaced circular formation; and to provide the male member with a head or flange of a form for the yielding gripping elements of the female member to lock therewith so that said members may be securely held together in locked engagement when coupled.

A further object of the invention is to provide the male member with means adapted to be conveniently operated for unlocking the head or flange thereof from the yielding gripping elements of the female member whereby said members may be readily uncoupled.

Furthermore, my invention has for its object to provide forms of members of the coupling wherein one of the said members consists of two male members combined and the other form consists of two female members combined. These members are adapted to be employed independently of the forms of the members attached upon the ends of the sections of the hose, and may be used for connecting either two male or two female members of the hose coupling when the sections thereof have been accidentally laid so that the two male members or the two female members are in close proximity instead of being laid in alternate arrangement, thus avoiding the necessity of moving the hose in order to transpose the ends of the sections thereof.

A practical embodiment of the invention is represented in the accompanying drawing forming a part of this specification in which similar characters of reference indicate corresponding parts in all the views, the said invention being more fully described hereinafter and then pointed out in the appended claims.

In the drawing, Figure 1 is a detail view, partly fragmentary, of the single male member attached upon the end of a section of hose. Fig. 2 is a sectional view of the single female member fastened upon one end of a section of hose. Fig. 3 is a plan view of one end of the male member. Fig. 4 is a detail side view of the female member fastened upon the end of a section of hose. Fig. 5 is a detail side view of two male members combined. Fig. 6 is a detail side view of two female members combined. Fig. 7 is a plan view of the mouth of the female member. Fig. 8 is a detail side view of the male member of a form of coupling for connecting pipe, etc. Fig. 9 is a section through the female member of the form of coupling for connecting pipe, and Fig. 10 is a plan view of the mouth of the female member shown in Fig. 9.

The coupling 10 is composed of a male member 11 and a female member 12, each of which has a tubular portion 13 and 14, respectively of any desired diameter and length, and may be made of any preferred metal. One end of the tubular portion 14 of the female member 12 is interiorly threaded, as 15, in the usual manner so as to be fastened upon one end of the section 16 of a hose, as 17, or said tubular portion may be connected to the hose by any preferred means, and one end of the tubular portion 13 of the male member 11 is likewise interiorly threaded, as at 18, so as to be similarly fastened upon the opposite end of the same section 16 of the hose or attached upon one end of a separate section, as 19, of hose. The opposite end of the tubular portion 14 of the female member 12 has an exteriorly enlarged part or band, as 20, and the interior surface of said enlarged part is circumferentially beveled or reduced, as at 21, whereby an annular shoulder 22 is provided upon the exposed edge of the enlarged part 20. The periphery of the interior of the tubular portion 14 is smaller in diameter than the interior of the enlarged part 20, a seat 20$^a$ is thereby provided for a resilient gasket or cushion 20$^b$.

Projecting from the annular shoulder 22 is a ring or annular flange 23 which forms a mouth 24 for the female member 12, and into said mouth the male member 11 is inserted when a union of the coupling is made. In order to hold in locked engagement the male member 11 and the female member 12 when coupled, the annular shoulder 22 is provided with a plurality of openings 25 which are spaced at intervals around said shoulder, and through each of said openings is disposed one of a plurality of yielding gripping elements 26. Each of the gripping elements 26 is made of spring metal and has an arm 27 of preferably sufficient length to extend through its respective opening 25 so that one end thereof may be fastened by screws 28, or otherwise, upon the tubular portion 14. Upon the opposite end of each of the arms 27 of the gripping elements 26 is formed a head or catch 29 having a beveled face, as 30, which is exposed so that the beveled faces of all of said catches are in apposed concentric arrangement within the mouth 24 of the female member 12.

Exteriorly of the threaded end 18 of the tubular portion 13 of the male member 11 is provided a rim 31 and upon the apposite end of the tubular portion 13 is formed an annular head or flange 32 which is of larger circumference than the exterior of the tubular portion 13 so as to provide a projecting shoulder 33 which is spaced some distance from the rim 31. The edge of the annular head or flange 32 opposite to the shoulder 33 is peripherally beveled or reduced, as at 34, whereby said reduced end may readily be inserted between the yielding gripping elements 26. By this formation it is evident that in coupling the male member 11 and female member 12 the beveled reduced edge 34 of the annular head or flange 32 of the male member 11 will pass centrally of the beveled catches 29 of the gripping elements 26 and force said elements to expand so as to permit said annular head or flange to enter the mouth 24 of the female member 12 sufficient distance for the beveled reduced edge 34 of the head or flange 32 to rest against the beveled edge 21 of the annular band 20 of the female member 12. The yielding gripping elements 26 will then return to their normal position and each of the beveled catches 29 will simultaneously pass over and engage the shoulder 33 of the annular head or flange 32 of the male member 11 thereby securely locking both members together.

In order to disconnect the male member 11 and the female member 12 from locked engagement I provide a plurality of projecting parts 35 formed in spaced arrangement upon the face of the rim 31 which is in opposed relation to the head or flange 32 of the male member 11. Each of the projecting parts or tapered teeth 35 has a semi-hexagon free edge 36, as shown, or may have a curved free edge, if desired, and the spaces between said tapered teeth are of sufficient width to form recesses 37 which are of the same width and depth as the teeth. Upon the tubular portion 13 of the male member 11, and between the semi-hexagon or curved projecting parts and the beveled head or flange 32, is a releasing element 38 which is adapted to be manually operated in conjunction with the teeth 35 for unlocking the male member 11 and the female member 12 when coupled together. The releasing element 38 is in the form of a rotatable and slidable collar or ring 39 which may be formed with an open, or split wall, as indicated at 39$^a$, then sprung into position and may afterward be soldered, or welded together, and one edge of said collar or ring is tapered or ground to a sharp edge, as at 40. Projecting from the opposite edge of the collar or ring 39 is a plurality of teeth or extending parts 41, each of which has a semi-hexagon or curved free edge of a corresponding shape and size to the tapered teeth 35 of the rim 31. The extending parts or teeth 41 are spaced apart at similar distances to the teeth or projecting parts 35 so as to provide recesses 42 therebetween which are of the same width and depth as said teeth 41. By this arrangement, as illustrated, the tapered teeth 35 of the rim 31 and the tapered teeth 41 of the slidable collar 39 of the releasing element 38 are adapted to interfit. In order to move said releasing element to uncouple from locked engagement the male member 11 and the female member 12 a teat or knob 42$^a$ is provided upon the collar or ring 39, and over said knob is passed the apertured end of a spanning wrench or key 43, as shown in Fig. 1. By forcing the spanning wrench 43 in a direction to rotate the collar or ring 39 upon the body 13 of the male member 11 one edge of each of the tapered teeth or extending parts 41 thereof will engage the corresponding edges of the tapered teeth or projecting parts 35 of the rim 31 and by this engagement said collar will be moved so that its tapered edge 40 will pass between the beveled catches 29 of the yielding gripping elements 26 of the female member 12 and force an extension of said yielding gripping elements. The catches 29 will then be disengaged from the shoulder 33 of the annular head or flange 32 of the male member 11 and the female member 12 may be conveniently uncoupled therefrom.

In Fig. 5 is shown a form of male member, as 44, wherein two male members 45 and 46 are combined and which is adapted to be employed for coupling the single female members attached to the ends of the sections of more particularly fire hose when said sections have been accidentally laid so that the female members thereon are in proximity instead of the sections of the hose being placed in the usual manner where the male and female members should be adjacent to each other, thus avoiding the waste of time and difficulty in transposing the ends of one of the sections of the hose. The male members 45 and 46 are provided upon an annular band 47, and are alike in form and identical in construction to the single male member 11, as heretofore described. Each of said male members 45 and 46 may be locked or unlocked to a female member by the use of the spanning wrench 43, in the same way the single male member 11 and the single female member 12 are connected or disconnected.

Fig. 6 illustrates a form of female member 48 wherein two female members 49 and 50 are combined and designed to be used for connecting the single male member fastened upon the ends of the sections of especially fire hose when said sections have been accidentally laid, as above described, in connection with the combined male member 44. The female members 49 and 50 are formed upon the opposite edges of an annular band 51 and are also alike in form and identical in construction to the single female member 12, heretofore described, and each of said members may be coupled or uncoupled to a male member in the same manner as previously mentioned.

In Figs. 8 and 9 are shown a form of coupling 52 adapted for use to detachably connect pipe of various kinds, and handles to implements, or the like. The coupling 52 comprises a male member 53 and a female member 54. The female member 54 has a tubular portion 55 and one end thereof may be fastened in any suitable manner to one end of a section of a pipe, or may be attached to the end of a handle for use in conjunction with an implement. The female member 54 of the coupling 52 is similar in construction to the single female member 12 of the coupling 10, and upon the opposite end of said female member 54 is provided an enlarged portion 57 having an annular shoulder 59, and extending from said shoulder is a concentric ring or flange 60 which provides a mouth 61 for the female member 54. Like the female member 12 in the shoulder 59 of the female member 54 is provided a plurality of spaced openings 61ª through each of which is disposed one of a plurality of yielding gripping elements 62 also made of spring metal, and each of said gripping elements has an arm 63 having one of its ends fastened upon the tubular portion 55. Formed upon the opposite end of each of the arms 63 is a head or catch 64 having a beveled face, as 65, which is exposed so that the beveled faces of all of said catches are in opposed concentric formation within the mouth 61 of the female member 54. The male member 53 has a tubular portion 66 and one end of said portion 66 may be connected by any preferred means to one end of a section of a pipe, or said end of the tubular portion may be fastened to the part of an implement for use in conjunction with a handle carrying the female member 54. Also similarly to the single male member 11 of the coupling 10 the tubular portion 66 of the male member 53 has adjacent to its opposite end a head or flange 68, and said head is of larger circumference than the portion 66 so as to provide a shoulder 70 at the edge thereof opposite to the free end of the tubular portion 66. In this form of coupling I employ upon the male member 53 a releasing element 71 adapted to be manually operated for unlocking said male member and the female member 54 when connected, and which dispenses with the use of the spanning wrench 43. The releasing element 71 comprises a collar 72 which encircles the tubular portion 66 of the male member 53, and one of its edges is tapered, as at 73. Upon the opposite edge of the collar 72 is formed a flange 74 which is adapted to be gripped by the hand of a person so as to operate the releasing element 71 for unlocking the male member and the female member of the coupling 52 in a manner similar to disconnecting the male member 11 and female member 12 of the form of coupling 10.

In the foregoing description I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:

1. In a coupling of the character described, the combination of a coupler adapted for connecting two pieces of hose, or pipe, each of the ends to be coupled being fitted with a female member, said coupler comprising a tubular sleeve having two tapered ends, each adapted for engagement with the beveled annular interiorly disposed flange upon the female member of the coupling, and each of said tapered ends having an annular flange said flange having a shoulder for engagement by the gripping members of the female member of the coupling, said sleeve having also a centrally disposed annular flange on its exterior periphery, said flange having on each edge thereof a series of teeth integrally formed therewith, said teeth having inclined edges, and an annular collar rotatably mounted and longitudinally adjustable upon the said sleeve on each side of said flange, each of said collars having on one edge a series of teeth with inclined edges adapted for engagement with the teeth upon the said flange, said collars each having its opposite edge reduced to a knife edge whereby an inclined surface is provided for engagement with the gripping members, whereby the gripping members may be released by the said collars when the collars are actuated by a rotary movement, substantially as shown and described.

2. In a coupling of the character described, the combination of a coupler adapted for connecting two pieces of hose or pipe, each of the ends to be coupled being fitted with a male member, said coupler comprising a sleeve or band and having at each end an inner annular beveled surface adapted for engagement with the tapered end of the male member, said sleeve having an annular channel provided therein, adapted for retaining a suitable packing, said sleeve having also upon each end an enlarged portion upon the exterior periphery thereof, and a plurality of spaced longitudinal channels provided in the said enlarged portion of the sleeve, and seated in each of said spaced channels a yielding gripping member, adapted for engagement with the shoulder provided upon the flange of the tapered end of the male member of the coupling, said enlarged portion serving as a suitable housing for the said gripping members, substantially as shown and described.

This specification signed and witnessed this tenth day of February, A. D. 1911.

GEORGE J. COURTNEY.

Witnesses:
ROBT. B. ABBOTT,
E. M. JERKE.

---

Copies of this patent may be obtained for five cents each, by addressing the "Commissioner of Patents, Washington, D. C."